May 19, 1970 D. L. LANG 3,512,355

TELEPHONE TIMING DEVICE

Filed Oct. 26, 1967 2 Sheets-Sheet 1

INVENTOR.
DANIEL L. LANG

BY

Adams Cwayna & Haugen

ATTORNEYS

May 19, 1970 D. L. LANG 3,512,355

TELEPHONE TIMING DEVICE

Filed Oct. 26, 1967 2 Sheets-Sheet 2

INVENTOR.
DANIEL L. LANG

BY

Adams Cwayna & Haugen

ATTORNEYS 3,512,355

TELEPHONE TIMING DEVICE

Daniel L. Lang, Minneapolis, Minn., assignor to Goldentone Electronics, Inc., Minneapolis, Minn., a corporation of Minnesota Filed Oct. 26, 1967, Ser. No. 678,439
Int. Cl. G04b 5/20
U.S. Cl. 58—145 6 Claims

ABSTRACT OF THE DISCLOSURE

A telephone timing device, operated by the hookswitch and line selection buttons of the telephone, which records both the individual call time and the cumulative call time. The individual call timer is automatically reset to zero before each call.

This invention relates generally to a telephone call timing device and more particularly to a device for timing calls which may be made on one or several lines of a multiline phone. The device includes a first switch member actuating the system when a proper line is selected and a second switch mechanism engaging with the receiver of the phone such that when the receiver is lifted a first timing device is stopped and remains in timed position. Upon a second use of the same line the timing device will reset to zero for timing of the new call. The device also includes a cumulative time measuring system such that total time in which the particular line is used is noted.

This particular invention will obtain its greatest useage in multiline phones which include a long distance direct dial Watts line. The utilization of a Watts line is expensive and it is often difficult to charge properly to sales or accounts. This particular arrangement contemplates timing Watts or other selected lines upon individual phones which will result in a more proper allocation of time to accounts and likewise will assist in maintaining proper timekeeping records.

The particular design of applicant's unit permits an individual to record his own time for any particular call, likewise providing an automatic reset for the next time the phone is utilized on a particular line. The device as designed does not require instant reading of the time when the phone is again used and no reset of the time occurs until the particular line is again used.

The device further contemplates a use as a phone stand so as to become an integral unit with the phone.

It is therefore an object of applicant's invention to provide a line timing device for a multiline phone which will provide an individual phone time and cumulative phone time for anly oneof several particular lines on the phone.

It is a further object of applicant's invention to provide a telephone timing device which will record the time in which a line of a phone is in use and will stop the timing when the line is not in use and will not reset the time until the particular selected line is again used.

It is a further object of this invention to provide a telephone timing device for use with multiline phones having a unique reset mechanism for permitting individualtiming of individual calls on selected lines of a multiline phone.

These and other objects and advantages of my invention will more fully appear from the following description made in connection with the accompanying drawings, wherein like reference characters refer to the same or similar parts throughout the several views, and in which.

Figures 1, 2, 3:
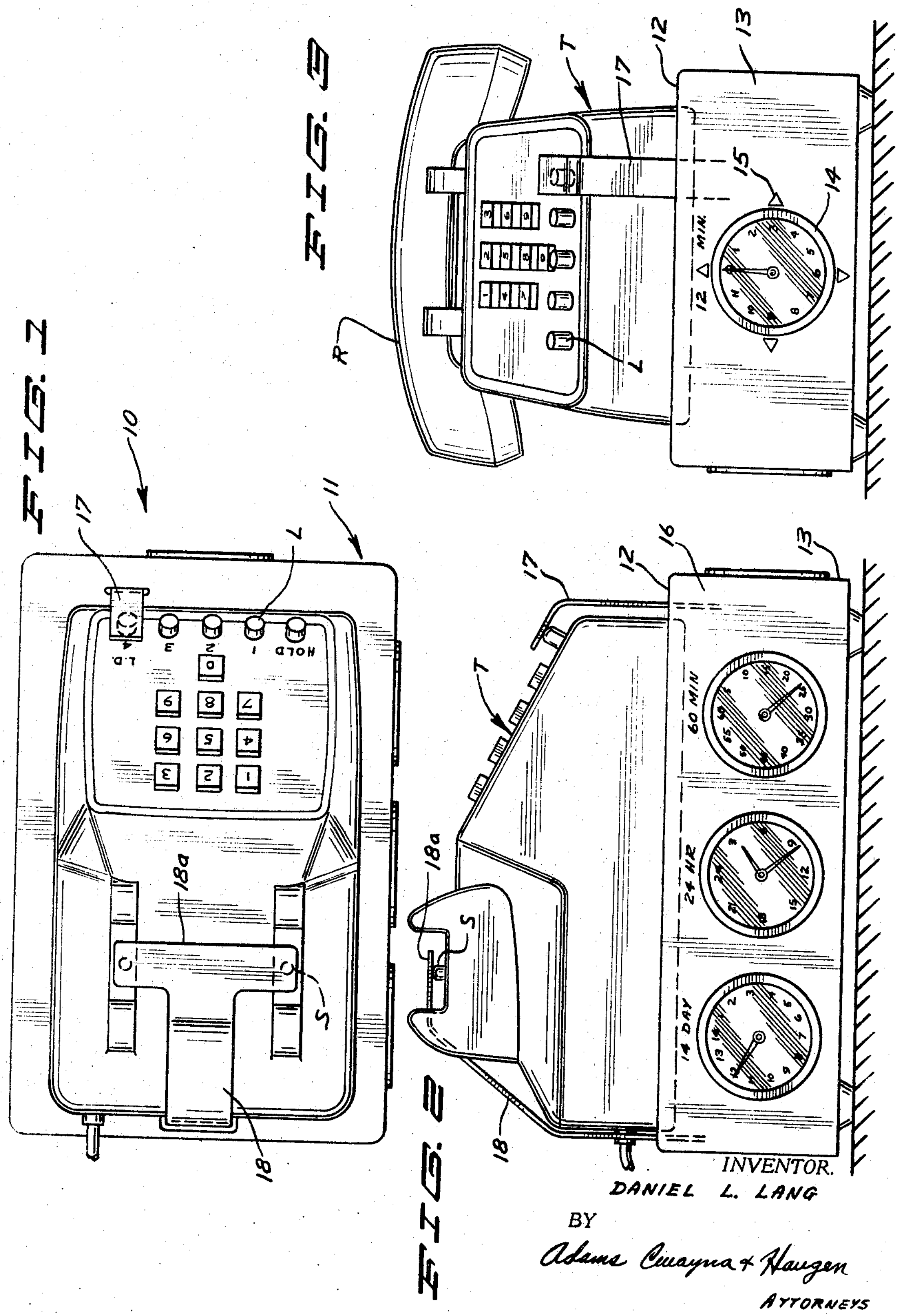
FIG. 1 is a top plan view of a telephone mounted in the timing device provided by applicant.
FIG. 2 is a side elevation of FIG. 1.
FIG. 3 is a front elevation thereof.

In accordance with the accompanying drawings applicant's phone timing device designated generally 10 is illustrated in conjunction with a telephone T having a plurality of line buttons L and having the standard receiver R and cradle switches S. Although the timer device 10 is illustrated controlling one single line, it should be obvious that the timing mechanism may be utilized with any one or several of the available lines.

The outer configuration of applicant's device 10 includes a housing 11 having a top surface 12 preferably arranged to receive the telephone base therein and hold the same in proper relation thereon. The housing 11 includes a front 13 extending downwardly from the top surface 12 having a first timing clock 14 thereon which timing clock is in the form shown arranged to time 12 minutes in one complete revolution of the hand 14*a*. Indicators such as lights 15 may beprovided at quarter points of the clock face 14 such that on continued revolutions of the hand it will be obvious when one complete 12 minute cycle has been concluded and these lights 15 will also provide a rough indication of time for the user. The mechanism for tripping the lights 15 is not discussed or shown in the accompanying circuit but it should be obvious that this could be accomplished through a relatively simple switching mechanism.

On one side 16 of the housing are provided a plurality of cumulative timing clocks such as the 60 minute, 24 hour and 14 day clocks. It should be obvious that the arrangement of these clocks could be altered depending upon the specific timing required and that the end purpose is primarily to give a complete time usage record. Logically, the applicant believes that these three clocks serve as a meter system which would be recorded periodically for any given phone having this system.

A first switching element 17 is provided in overlying operative relation to at least one of the line buttons L and it should be noted that this switch is a master switch as will be discussed with the accompanying diagram, FIG. 4.

As should be obvious to anyone acquainted with telephones this switch 17 will be returned to a non-energizing upper position when any other line button L is depressed.

A second switch member 18 is provided to extend upwardly from the rear of housing 11 and is provided with a T shaped forward end 18*a* to overly both of the cradle switches S. This switch 18 will then be actuated whether the user replaces the receiver R or whether he simply attempts to push one of the cradle switches S downwardly with his finger. Switch 18 is then actuated at all times but as will be illustrated in the accompanying circuit the switch 18 is often ineffective unless switch 17 is in depressed actuating position.

Figure 4:
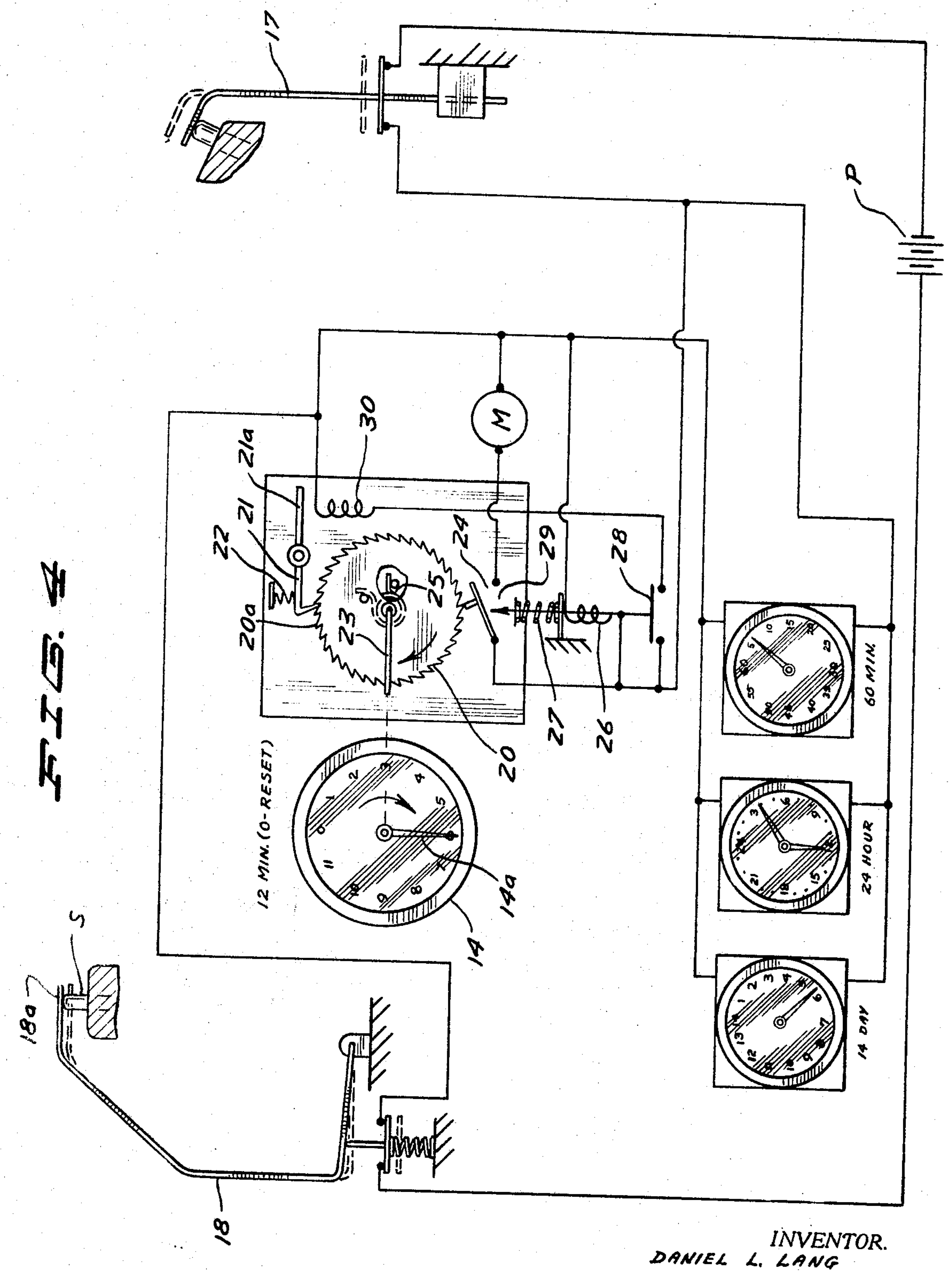
FIG. 4 is illustrating the circuitry employed in providing the applicant's concept.

The circuit controlling the timer clock 14 as well as the cumulative time clocks is illustrated in FIG. 4, which includes and illustrates the mechanism for actuating the reset to zero of time clock 14 which occurs with alternate depressions of the cradle switch S when the specific line switch 17 is actuated. The basic mechanism for the zero reset includes a ratchet wheel 20 driven in timed relationship with the hand 14*a* of clock 14 and this wheel 20 is spring loaded through a torsion spring 25 to normally return the hand to zero when a driving motor M is not driving the ratchet wheel 20 and hand 14*a* and when no hold back force, which force will be described hereinafter, is applied to the ratchet.

Ratchet wheel 20 is provided with teeth 20a on the outer periphery thereof to engage with a pawl member 21 which pawl 21 is normally spring loaded through spring 22 to be forced into engagement with the teeth 20a of the ratchet wheel 20 to prevent the back rotation thereof to return to the hand 14a to zero. The pawl 22 normally permits the rotation of the ratchet wheel 20 and the clock hand 14a in its normal time keeping direction when driven by the clock motor M. The ratchet wheel 20 is provided with a trip arm 23 thereon which trip arm is of a predetermined length to trip a switch 24 within the circuit when the clock hand 14a and accompanying ratchet wheel 20 are returned to zero.

The basic circuit includes switch 17 and switch 18 arranged in series with a source of power P which may be a battery with the cumulative timing clocks arranged in parallel with the circuit such that when both of the switches 17–18 are energized the cumulative time will automatically be kept.

The return mechanism and timing mechanism for the twelve minute clock includes a first solenoid 26 arranged in parallel with the circuit. This solenoid 26 is provided with a spring loaded plunger 27 on one end thereof with a switch closing contact 28 on the other end thereof. The plunger being spring loaded provides a mechanical actuation when de-energized due to the spring 27 to provide a mechanical tripping mechanism 29 to open the switch 24 whenever the solenoid 26 is de-energized. Upon energization the switch closing contact 28 closing the circuit. In this manner then when the circuit is energized switch 24 is free to move and is permitted to be closed by the action of the arm 23 on the ratchet wheel returning the clock arm 14a to zero. This closure will energize the clock motor M and permit the same to be driven in the proper time keeping direction.

In order to accomplish the reset function an electromagnet 30 is provided in series with the switch 28 closed by the solenoid plunger when the solenoid 26 is actuated and this electromagnet 30 operates against one end 21a of the pawl member 21 to normally pull the pawl 21 from the ratchet teeth of the wheel 20. This pawl shifting will permit the spring 25 to return the ratchet wheel 20 and the accompanying clock hand 14a to a zero position which zero position may be governed by a positive stop which either engages arm 14a or wheel 20 after the same has closed the switch 24. It is obvious that the clock arm 14a could rotate several times without interfering with such a stop simply by providing a one-way stop mechanism and that the arm 23 would logically swing past the switch 24 when said switch is closed but would engage and close switch 24 when said switch is open and the arm 23 is rotating in the opposite direction. In this manner then, even though the clock may rotate through a period over twelve minutes, the return of the system will only require that the clock arm make a maximum of slightly less than one complete revolution in order to return the same to zero.

As discussed, the electrical circuit in FIG. 4 does not illustrate the means by which the lights 15 about the circumference of the clock 14 would be energized but this could be an obvious tripping mechanism provided through either the hand 14a or a tripping device arranged on the ratchet wheel 20. Applicant conceives that the twelve minute system is probably long enough for the normal telephone conversation and it is obvious that the entire time system could be changed to either increase or decrease the time kept by clock 14.

In operation of the circuit a description will be given wherein the clock has been previously utilized and therefore the relative position of the elements in the circuit are as shown in FIG. 4. When the clock will again be utilized the switch 17 is pushed downwardly to close its respective contacts and upon lifting the receiver R from the cradle switch S the circuit will be energized in the following manner. The cumulative clocks being connected in parallel to the system will be immediately energized upon the switch closure and the minimum amount of time required to accomplish the reset and accompanying start of the clock 14 motor will be minimal and therefore not necessary to calculate. Upon closure of the switch 18 electrical energy is directed to the solenoid 26, thereby energizing the same driving the core portion thereof downwardly against spring 27 closing switch 28. At this point the switch 24 remains open. Closing of switch 28 energizes electromagnet 30 thereby pulling down upon the lever pawl 21 against the spring 22. This pulling downwardly or release of the pawl 21 from the ratchet wheel 20 permits the ratchet wheel 20 to rotate due to the action of the torsion spring 25. It should be noted that at this time the motor M is not energized and this counter rotation is not against power. When the arm 23 carried by ratchet 20 returns to its proper zero position it will mechanically trip switch 24 thereby engaging and closing the circuit to the clock motor M. The clock motor will then drive the hand and ratchet wheel as illustrated in a clockwise direction, keeping the proper time. When the receiver is replaced or open switch 18, the circuit to the solenoid 26 will likewise be opened and the spring loaded mechanical plunger of the solenoid will physically open the switch 24 thereby shutting off the current to the clock motor M while practically simultaneously de-energizing the electromagnet 30 to permit the pawl 21 to be driven into holding relationship with the ratchet wheel 20 due to the loading of spring 22. Should another call be made on this same line when the switch 17 is depressed naturally the same sequence of events will occur. If the switch 18 is lifted and closed without the switch 17 being initially depressed, then the entire circuit will of course not be actuated as the series relationship between switches 17 and 18 provides an over-ride for switch 17.

It should be obvious that applicant has provided a new and unique telephone timer system which permits the utilization of a timing device on one or more selected lines of a telephone which timing device includes a holding feature for recording the time after the call is terminated with an automatic reset for timing the next call. The system also contemplates the keeping of cumulative records through the utilization of various clock systems.

It will, of course, be understood that various changes may be made in the form, details, arrangements and proportion of parts without departing from the scope of my invention, which generally stated consists in the matter set forth in the appended claims.

What is claimed is:

1. A telephone timing device including a circuit having:

(a) as source of power;
(b) a first switch;
(c) a second switch associated with the telephone hookswitch and arranged for actuation when the telephone is energized;
(d) a timing clock motor arranged for energization by said power source and controlled by said switches including:
  (1) at least one time keeping element;
  (2) means holding said element in a position to which it has been moved during the period said motor is energized; and
  (3) means normally arranged to rewind said element to a first position and held by said holding means when said motor is de-energized; and
(e) means releasing said holding means when said clock is energized to permit said element to return to the first position.

2. The structure set forth in claim 1 wherein said holding means including a ratchet wheel driven by said clock motor simultaneously with said time keeping element and a pawl engaging said wheel when the circuit is de-energized.

3. The structure set forth in claim 2 wherein said pawl is normally biased into wheel engaging position and electrical means for disengaging said pawl from said wheel to permit the return thereof.

4. The structure set forth in claim 1 and third switch means arranged in operative relation to said time keeping element for actuation thereby when said element has been returned to said first position.

5. The structure set forth in claim 4 and electrically responsive tripping means arranged in operative relation to said third switch, opening said third switch when said first or second switch is opened.

6. The structure set forth in claim 1 and at least a second timing clock arranged for cumulative timing whenever the circuit is energized.

References Cited

UNITED STATES PATENTS

| | | | |
|---|---|---|---|
| 349,539 | 9/1886 | Tabony | 58—39.5 XR |
| 2,312,077 | 2/1943 | Cowles | 161—1 |

KATHLEEN CLAFFY, Primary Examiner

J. S. BLOCK, Assistant Examiner

U.S. Cl. X.R.

58—39.5, 152; 179—7.1